No. 636,383. Patented Nov. 7, 1899.
W. C. & R. A. HARTMANN.
CENTRIFUGAL CREAM SEPARATOR.
(Application filed Nov. 1, 1897.)
(No Model.) 4 Sheets—Sheet 1.
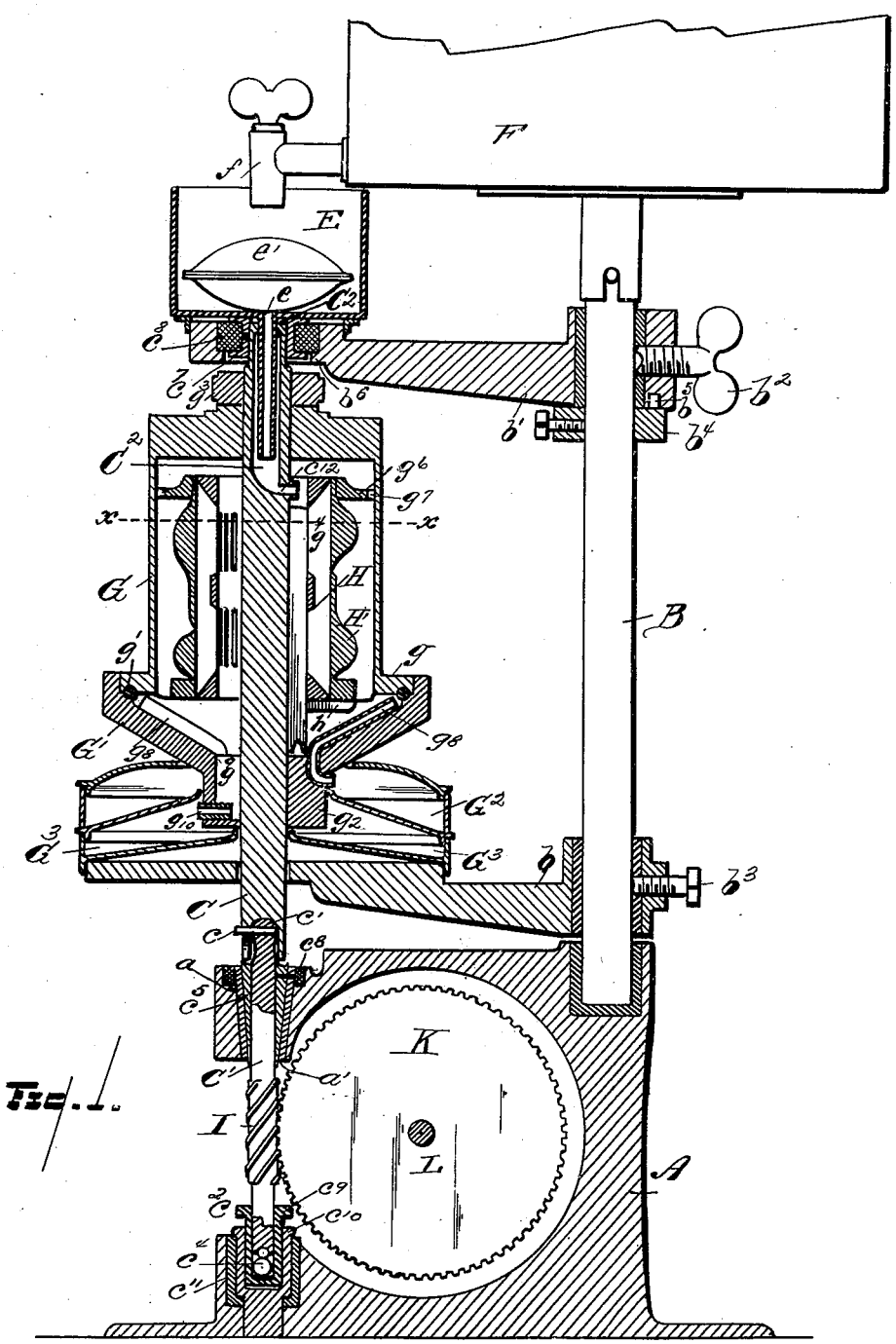
WITNESSES
INVENTORS

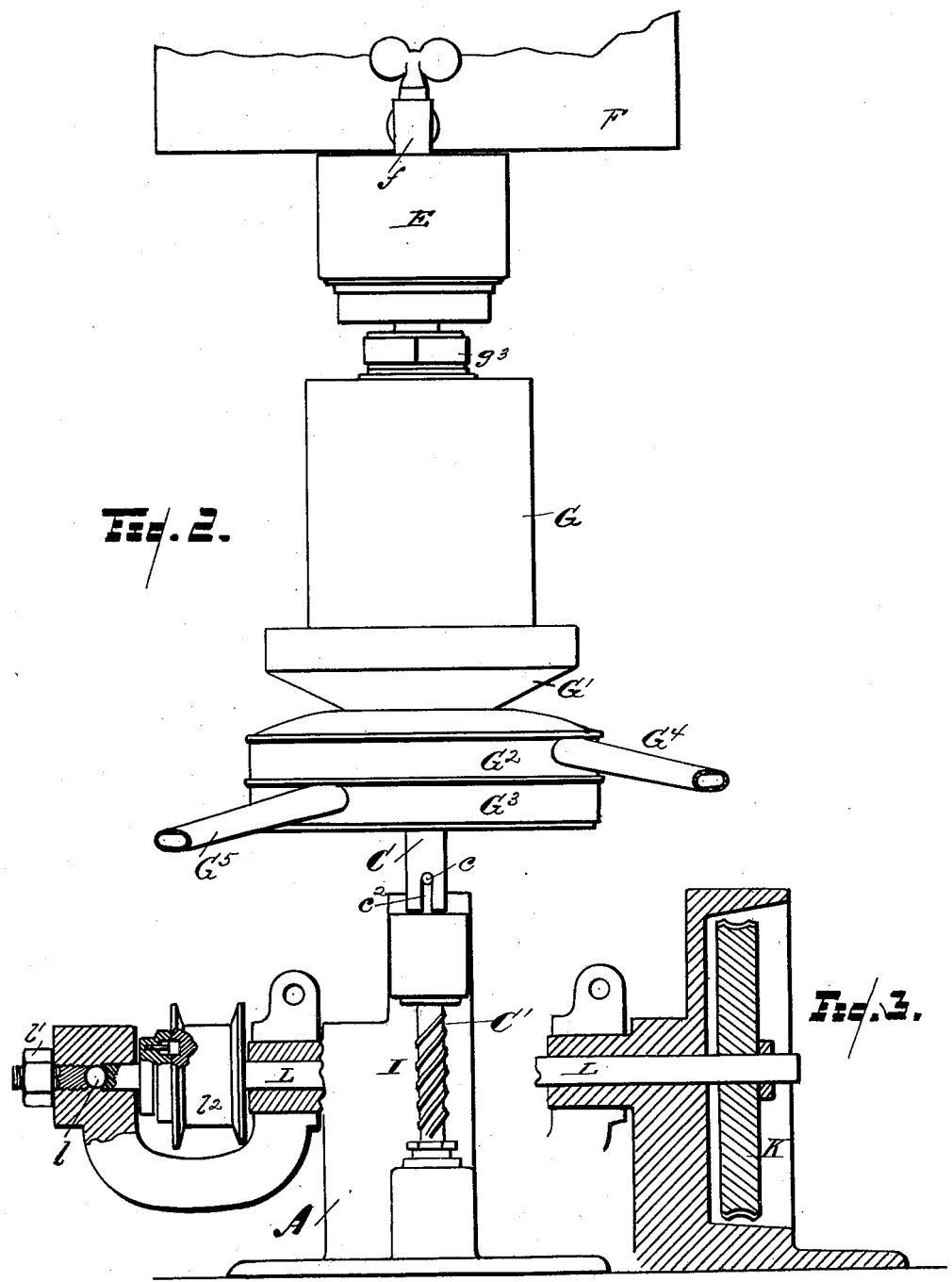

No. 636,383. Patented Nov. 7, 1899.
W. C. & R. A. HARTMANN.
CENTRIFUGAL CREAM SEPARATOR.
(Application filed Nov. 1, 1897.)
(No Model.) 4 Sheets—Sheet 3.

WITNESSES
INVENTORS
William C. Hartmann
and
Richard A. Hartmann
By Fisk and Thomas
Attys No. 636,383. Patented Nov. 7, 1899.
W. C. & R. A. HARTMANN.
CENTRIFUGAL CREAM SEPARATOR.
(Application filed Nov. 1, 1897.)

(No Model.) 4 Sheets—Sheet 4.

WITNESSES
G. H. Warren
W. H. Nantais

INVENTORS
William C. Hartmann
Richard A. Hartmann
By Fisk & Thomas attys.

UNITED STATES PATENT OFFICE.

WILLIAM C. HARTMANN AND RICHARD A. HARTMANN, OF DETROIT, MICHIGAN, ASSIGNORS, BY MESNE ASSIGNMENTS, TO THE ROYAL SEPARATOR COMPANY, OF MICHIGAN.

CENTRIFUGAL CREAM-SEPARATOR.

SPECIFICATION forming part of Letters Patent No. 636,383, dated November 7, 1899.

Application filed November 1, 1897. Serial No. 657,011. (No model.)

*To all whom it may concern:*

Be it known that we, WILLIAM C. HARTMANN and RICHARD A. HARTMANN, citizens of the United States, residing at Detroit, county of Wayne, State of Michigan, have invented a certain new and useful Improvement in Cream-Separators; and we declare the following to be a full, clear, and exact description of the invention, such as will enable others skilled in the art to which it pertains to make and use the same, reference being had to the accompanying drawings, which form a part of this specification.

Our invention relates to cream-separators, and is shown in the accompanying drawings, in which—

Figure 4:
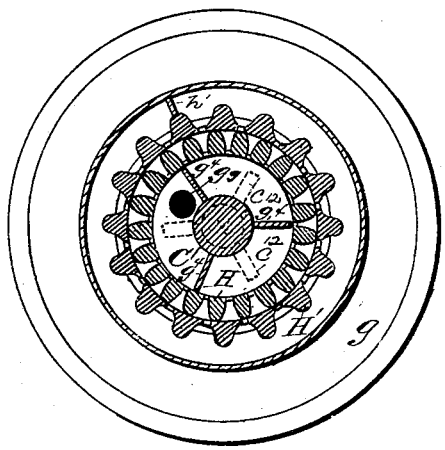
Figure 5:
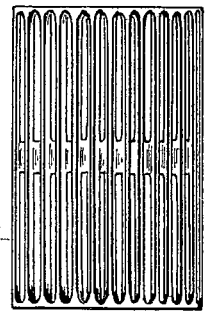
Figure 6:
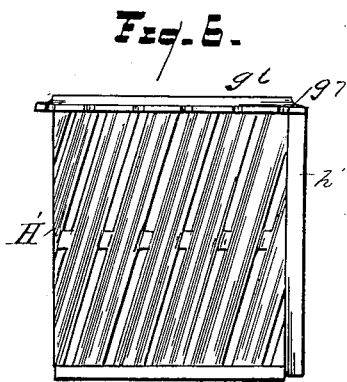
Figure 7:
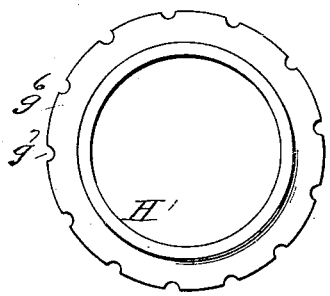
Figure 8:
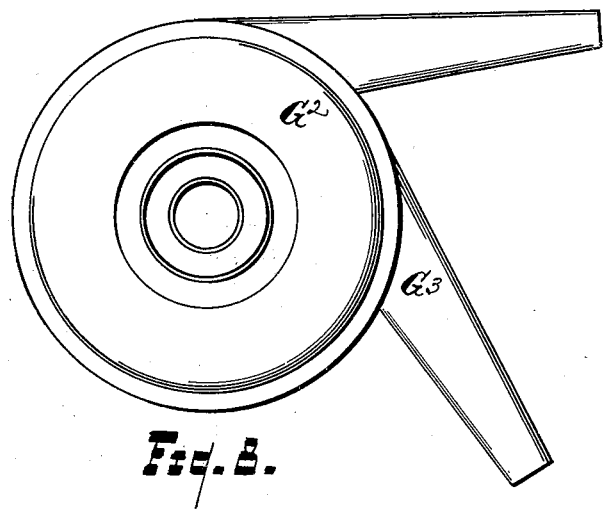
Figure 9:
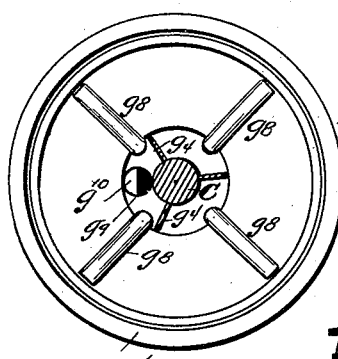
Figure 10:
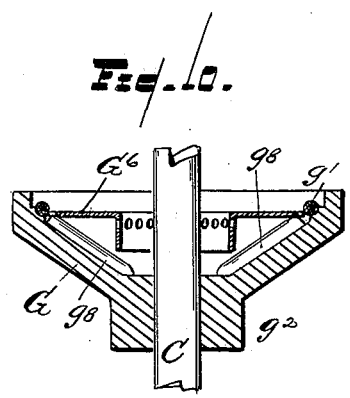
Figure 11:
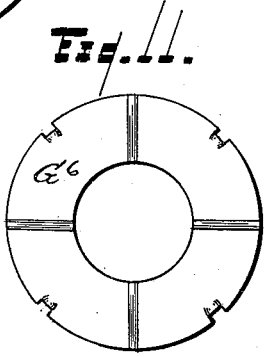

Figure 1 is a vertical section. Fig. 2 is an elevation, partly in section; Fig. 3, a sectional view of parts not seen in Fig. 2; Fig. 4, a horizonal section on line $x$ $x$, Fig. 1; Fig. 5, an elevation of the inner screen, and Fig. 6 an elevation of the outer screen; Fig. 7, a plan view of outer screen, showing the construction of the upper rim; Fig. 8, a plan view of the receiving-cans; Fig. 9, a view showing the interior of the inclined bottom of the bowl. Fig. 10 is a section showing removable diaphragm, and Fig. 11 is a plan view of same.

In the drawings, A is the base of the machine, B a standard mounted in the frame, and $b$ and $b'$ horizontal arms extending from the standard B, between which the separator rotates. These arms are held to the standard by set-screws $b^2$ $b^3$, the lower one resting on the base A and the upper one on the collar $b^4$. This collar is provided with a pin $b^5$, that enters a hole in the arm. This construction is such that when the upper arm $b$ is removed and replaced it will be held in the same elevation by the collar and in the same direction by the pin connection.

C and C' represents the vertical shaft of the machine made in two parts with a socket-joint. The pin $c$ is fixed in the point $c'$, and the shaft is slotted at $c^2$, so as to slip over the pin. The lower portion of the shaft is mounted in adjustable step-bearing $c^3$ on the ball $c^4$. This bearing consists of the inner journal-box $c^9$, threaded on the outside, and the outer box $c^{10}$, threaded on the inside, and the Babbitt-metal bushing $c^{11}$. The upper end of this portion C' of the shaft is provided with a journal that runs in a cone-shaped bearing $c^5$, made to correspond with a similarly-shaped opening $a'$ in the base. This opening is larger than the journal-box, and when the machine is set up the space between is filled with Babbitt metal to form a bushing for the bearing. The use of Babbitt-metal bushing permits us to true up the shaft in assembling it and then run in the Babbitt metal, and thereby insure perfect alinement of the bearing without great expense. In constructing this, as well as the other Babbitt-metal bushings, we cut a channel $a$ in the box to receive a portion of the metal and form a key to prevent the bearing from turning or loosening. The upper end of the shaft C has its bearing in a metallic bushing $c^7$. This bushing is supported in a felt washer $c^8$, and the felt washer is supported in the arm $b'$ on the annular ledge $b^6$. The metal bushing $c^7$ we prefer to make square on the outside to fit a like form to the inside of the felt washer to prevent the bushing turning in the washer. The object of the felt washer is to allow a slight vibration to the upper end of the shaft due to the impact of milk against the side of the can in starting. It also serves as an absorbent for lubricating-oils and serves the purpose of an oil-cup. The upper end of the shaft is bored out at $C^2$ and is provided with horizontal passages $c^{12}$ from this bore to the interior of the separator-bowl G.

E is a closed milk-cup having the outlet-pipe $e$, that extends into the bore $C^2$.

F is the supply-tank, from which the milk is admitted to the milk-cup E through the faucet $f$. The milk-cup E is provided with a float-valve $e'$, by which a uniform amount of milk is maintained in the cup and a uniform supply in the separator.

G is the upper and cylindrical portion of the separator-bowl and is provided with the annular flange $g$, by which it is connected with the cone-shaped lower portion G' on a rubber gasket $g'$ between the two. The hub $g^2$ is keyed to or shrunk on the shaft, and the upper head of the cylinder G fits the shaft and is forced downward by the set-nut $g^3$, run on the shaft. By setting up the nut $g^3$ the upper and lower portions of the separator are brought together on the gasket $g$, making a tight joint.

The shaft within the separator is provided with three wings $g^4$, extending along the shaft, over which is placed the screen H and over it the screen H'. These screens are supported on arms $h$, extending from the wings $g^4$, and are approximately of the length of the cylinder G, each consisting of a series of bars $g^5 g^5$, joined together at the top and bottom and at the center, those in the screen H being vertical and those in the screen H' being diagonal or spiral. The bars on the outer screen are larger or broader than those on the inner screen, and in each case they are cone-shaped in cross-section, with the base facing inward. The bars in the outer screen are united at the top by the ring $g^6$, which fills the space between the screen and the wall of the bowl and through which are openings $g^7$. The portion G' of the separator is in the shape of an inverted cone, having the shaft for its apex, and its greatest diameter greater than that of the cylinder. $g^8 g^8$ are milk-passages leading from the extreme outer portion of the cone G' inward within the bowl to the hub $g^2$ and thence outward into the milk-chamber $G^2$. Heretofore the bottom of the bowl has been made flat and thick and the outlet milk-passages bored in the bottom and with right-angle turns, thereby increasing the difficulty of cleaning. In our construction the bottom of the bowl is larger than the body, is inclined inward, and can be made of sheet or thin metal, while the pipes are inclined and lie along the bottom without a right-angle bend.

$g^9$ is a cream-passage leading directly downward into the hub $g^2$, alongside of the shaft, and has its outlet through the adjustable plug $g^{10}$ into the cream-chamber $G^3$.

$G^4$ is the delivery-spout from the milk-chamber $G^2$, and $G^5$ the delivery-spout from the cream-chamber.

In Figs. 1, 2, and 3 we illustrate the means employed to drive the machine. I is a worm cut on the lower portion of the shaft C', and K is a toothed wheel mounted in the same plane as the shaft and in engagement with the worm. The wheel K is mounted on the horizontal shaft L and runs at one end against the ball-bearing $l$. This bearing is made adjustable by the set-screw $l'$. The object of this adjustment is to keep the center of the wheel K in the same plane as the center of the worm I to prevent the wearing of the ends of the teeth on the wheel. The shaft L is driven through the pulley $l^2$, the pulley being connected with the shaft by any suitable clutch mechanism in such a manner that the separator may continue to rotate without jar or sudden stop when the power stops suddenly from any accident or other cause.

The operation of the separator is as follows: The machine having been started, the faucet $f$ is opened and the milk from the supply-tank F permitted to enter the milk-cup E, from which it flows downward and through the outlet-pipe $e$ into the core $C^2$ and out into the separator-cylinder G through the horizontal passages $c^{12}$, from which it is thrown by centrifugal force outward and against the inside of the screen H and outward through it between its bars onto and through the screen H'. The screens act as resistances and aid in separating the cream from the milk by resisting the outer movement of the cream. As the milk works downward through the cylinder G the cream is forced inward by the greater weight of the milk until it reaches the bottom, when the cream will lie along the shaft, while the milk from which the cream has been extracted will seek the enlarged portion of the separator, from which it flows out through the passages $g^8 g^8$ into the milk-chamber $G^2$ and thence out through the outlet-pipe $G^4$. The cream works down along the shaft through the passage $g^9$ and plug $g^{10}$. This plug is threaded and provided on the outer end with a transverse groove, so that it can be adjusted with a screw-driver in order that its inner end can be placed at a greater or less distance from the center of the bowl to adapt it to draw off cream of only the proper richness. The cream passes into the cream-chamber $G^3$ and is drawn off through the spout $G^5$. One great advantage in the construction shown herein arises from the fact that the cream and milk are both permitted to work downward and out below, and when the device is to be cleaned hot water can be admitted at the top and worked through, thereby thoroughly scalding and cleaning all the parts without removing them. All of the delivery-passages leading downward, taken in connection with the inclined bottom to the bowl, makes this means of cleansing the machine thoroughly effective.

While we are aware that the driving-shaft has been made in two portions, we are not aware that a ball-and-socket joint has ever been employed either with or without the yielding bearing for the upper end of the shaft. While we are also aware that Babbitt-metal bushings are common, we are not aware that they have been used as supports for journal-boxes in separators in combination with like bushings to line up other parts of the machine with the journals.

By means of the adjustments used for the upper arm we are enabled to lift it off from its supports, together with the milk-cup and journal-bearings supported on it, with the certainty that we can return it to the exact position it occupied when removed. By the adjustments of the lower arm we are enabled to bring the stationary milk and cream chambers into the proper relation with the separating-bowl and shaft. As the wearing of the worm and teeth on the driving-wheel requires the driving-shaft to be adjusted, the receiving-chambers would be thrown out of their position relative to the separator if a counter adjustment were not provided.

In Figs. 10 and 11 we show diaphragm G⁶ between the upper and lower portions of the bowl for use when it is desired to make a smooth cream for ice-cream manufacture or other like purposes. This plate holds the cream, thereby protecting it from being broken up in any degree.

Owing to the high speed required for the separation of the cream and the liability of the moving contents of the bowl throwing the machine out of balance the advantage of the yielding bearing for the upper end of the shaft is great.

The separation of the cream is facilitated by the construction of the screens H and H'. By making the bars flat on the inside a plane surface is provided, on which the cream can rest and be conducted downward through the bowl, while the narrow opening between the bars permits the skimmed milk to work outward. The bars on the outer screen being diagonal cut across the openings between the bars on the inner screen, and the milk in moving outward comes directly against the outer bars. The movement of the cream and milk being constant within the bowl, the screens thoroughly divide or stir the milk without grinding it or breaking up the cream globules, thereby making a perfect separation without frothing, the frothing attending the operation in other devices being due to the breaking up of these globules of cream. Drawing the cream off from the lower end of the bowl avoids lifting within the bowl and aids in preventing the frothing.

What we claim is—

1. In a cream-separator a bowl consisting of upper and lower sections, the upper section consisting of a cylinder provided with a flange at its lower part, and its lower section consisting of an inverted cone, said upper and lower sections connected by said flange, substantially as described.

2. In a cream-separator the combination of the driving-shaft, a bowl consisting of upper and lower sections, its upper section consisting of a cylinder and its lower section consisting of an inverted cone of a maximum diameter greater than the diameter of the cylinder, means connecting the outer lower edge of the cylinder and the upper edge of the cone and means for fixing the cone to the shaft, and the set-nut $g^3$, substantially as described.

3. In a cream-separator the bowl consisting of the cylinder forming the upper section of the bowl, the hollow inverted cone forming the lower section of the bowl of greater diameter than the cylinder, a flange connecting the outer edge of the cone and the cylinder, and the diaphragm G⁶, substantially as described.

4. In a cream-separator the bowl consisting of the cylinder, baffle-screens within said cylinder, and the hollow inverted cone forming the lower section of the bowl, of a maximum diameter greater than said cylinder, said cylinder opening at the bottom into said hollow cone, substantially as described.

5. In a cream-separator, the combination of the driving-shaft, the bowl, an annular screen within the bowl provided with vertical bars, an outer screen having diagonal bars, and means for supporting the screens in place, substantially as described.

6. In a cream-separator the combination of the driving-shaft, the bowl, and inner and outer separate screens mounted around the shaft and within the bowl, each formed of parallel bars, the bars of the screens inclined at an angle to each other, substantially as described.

7. In a cream-separator the combination of a bowl, and an inner and an outer screen located within the bowl, one of said screens provided with vertical bars and the other with diagonal bars, substantially as described.

8. The combination of the base A, the jointed driving-shaft, the bowl mounted on the shaft, means located in the base for driving the shaft, the standard B, the arm $b$, supported on said standard and supporting the skim-milk and cream, recipients, the arm $b'$ removably supported on said shaft and arranged to form a bearing for the upper end of the driving-shaft and to support the milk-cup E and the adjustable collar $b^4$ provided with the pin $b^5$, substantially as and for the purpose described.

In testimony whereof we sign this specification in the presence of two witnesses.

WILLIAM C. HARTMANN.
RICHARD A. HARTMANN.

Witnesses:
S. E. THOMAS,
M. E. THOMAS.